United States Patent [19]

Mori

[11] 4,353,065
[45] Oct. 5, 1982

[54] DIGITAL RADIO PAGING COMMUNICATION SYSTEM

[75] Inventor: Toshihiro Mori, Tokyo, Japan

[73] Assignee: Nippon Electric Co., Ltd., Tokyo, Japan

[21] Appl. No.: 240,873

[22] Filed: Mar. 5, 1981

[30] Foreign Application Priority Data

Mar. 28, 1980 [JP] Japan ................................ 55/39038

[51] Int. Cl.³ .............................................. H04B 1/16
[52] U.S. Cl. ............................ 340/825.44; 340/311.1; 455/38
[58] Field of Search ...................... 340/825.44, 825.47, 340/825.48, 311.1; 455/38, 127; 364/707

[56] References Cited

U.S. PATENT DOCUMENTS 4,194,153  3/1980  Masaki et al. .................. 340/825.44

OTHER PUBLICATIONS

"Error–Correcting Codes" by Wesley Peterson, The M.I.T. Press, copyright 1961, pp. 149–152.

Primary Examiner—Thomas A. Robinson
Attorney, Agent, or Firm—Laff, Whitesel Conte & Saret

[57] ABSTRACT

A digital radio paging communication system has a transmitter and a plurality of receivers. The receivers are energized intermittently to save battery power. The transmitter generates a preamble signal, a synchronization signal, a plurality of calling signals and a stabilization signal, which are arranged into a sequence of signals including two of the preamble signals separated by a measured time interval and at least one batch signal including the synchronization signal and the plurality of calling signals which are divided into a plurality of groups. Each group of calling signals have a stabilization signal at the leading portion thereof followed by a receiver identifying code. A carrier wave is modulated with the sequence of signals and then transmitted. Each of the receivers receives and demodulates the carrier wave. Responsive to the receipt of a first preamble signal, the receiver switches from intermittent to continuous power at an intermediate stand-by level. If a second preamble signal is received within a predetermined time period, the receiver switches to full power. From there, it either receives its own code and gives a paging signal or it times out. Either way, it returns to the intermittent battery saver mode. The two step raise in the power supply (i.e. from intermittent to full power), eliminates a clipping of initially received paging signals which sometimes occurs in the prior art before the receiver got up to full power.

14 Claims, 13 Drawing Figures

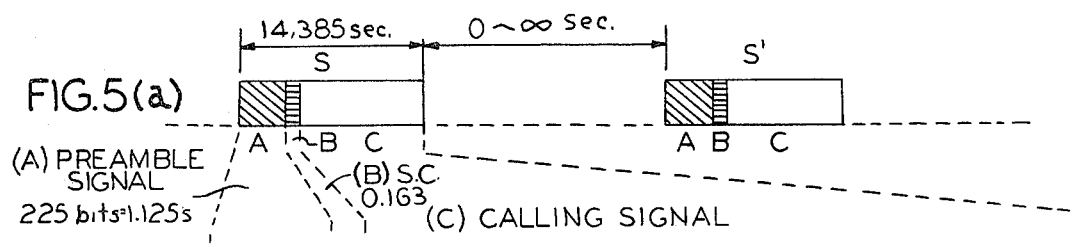
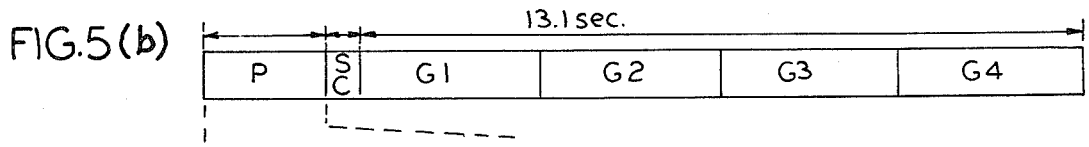
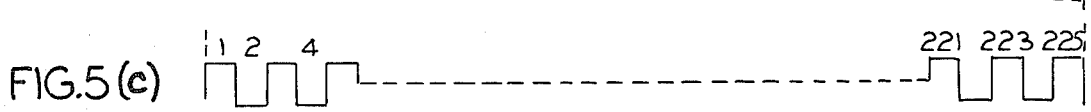
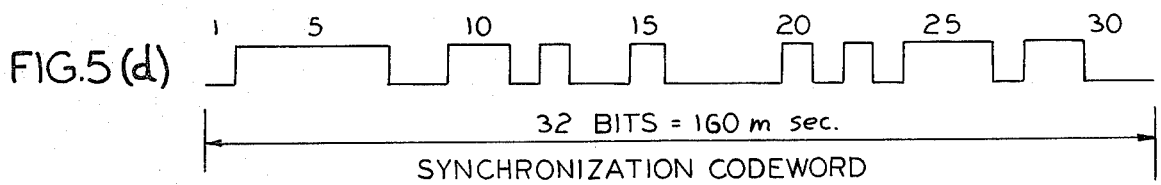
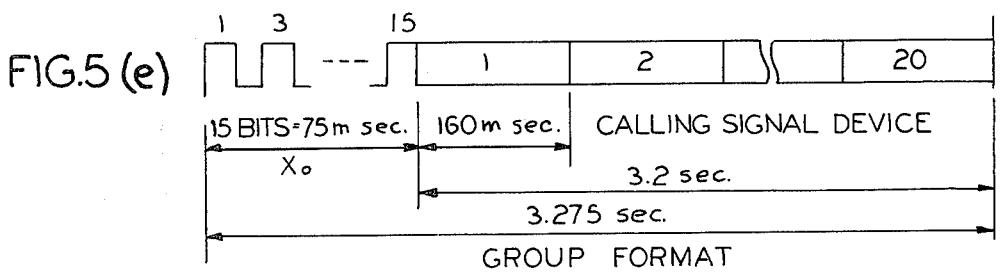
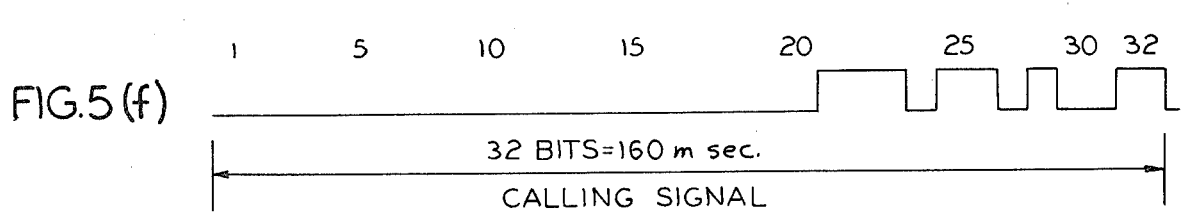
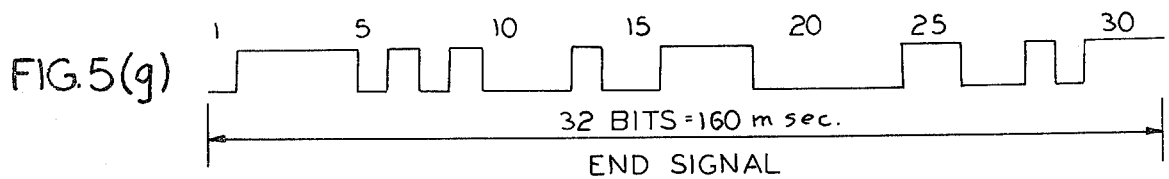

DIGITAL RADIO PAGING COMMUNICATION SYSTEM

BACKGROUND OF THE INVENTION

The present invention relates to a digital radio paging communication system in which a base station (or a transmitter) selectively calls a plurality of receivers, and more particularly to a digital radio paging communication system having receivers capable of battery saving (or low power drain).

In the nation-wide paging system proposed by the British Post Office, a base station transmits POCSAG signals or codes, each consisting of a preamble signal and a plurality of batches of code signals. (Each batch further comprises a synchronization signal and eight groups of calling signals).

A paging receiver, on the other hand, temporarily discontinues its battery saving operation in response to the preamble signal and achieves word synchronization in accordance with the synchronization signal. Then, it cuts off its power supply to its circuits, except for its timing circuit. The receiver restores its power supply to the circuits in the position of its own code group to detect calling signals and then again cuts off its power supply upon completion of its own code group. Further, upon detection of the synchronization signal in the next signal batch, the receiver repeats the above-described procedure and, if no synchronization signal is detected or if an idle signal is detected in its own code group, it returns to the battery saving operation.

However, such a receiver, as will be further described hereinafter, embodies no consideration for the period of time required, in building up the power supply in its own code group. The time period begins with the initiation of the power supply operation and continues until the receiver's stable signal receiving operation occurs. The receiver detects each group of signals only by bit synchronization, which is established with the preamble and synchronization signals. However, the receiver does not receive any signal for renewing bit synchronization within its own group or between its own group and the immediately preceding group. The result is that the calling signals of each group may be erroneously received under electric field fluctuations, such as fading. It further involves the problem that, if an uneven or biased pattern prevails, such as the consecutive occurrences of a logic "1" or "0" in digital signals, the reference voltage in a waveform shaping circuit in the receiver, as will be described hereunder, becomes biased. Consequently, correct data reproduction takes time.

Meanwhile, in the paging system, such as the one disclosed in the U.S. Pat. No. 4,194,153 assigned to the same assignee as the present invention, the base station transmits digital burst signals consisting of a preamble signal, a plurality of calling signals and an end mark signal. The receiver, on the other hand, discontinues its battery saving operation in response to the preamble signal, detects the ensuing calling signals and, when it detects the end mark signal, returns to the battery saving operation. In this system, however, once the receiver discontinues its battery saving operation in response to the preamble signal, it continues to consume power until it detects the end mark signal, even in the absence of its own calling signals. Accordingly, especially where there is a long block of calling signals, it needs improvement with respect to efficient use of power supply.

SUMMARY OF THE INVENTION

An object of the present invention is to provide a digital radio paging communication system of high reliability and low power drain, which obviates the aforementioned disadvantages.

A digital radio paging communication system of the present invention has a transmitter and a plurality of receivers. The transmitter comprises first, second, third and fourth means for generating a preamble signal, a synchronization signal, a plurality of calling signals and a stabilization signal, respectively. The outputs of the first, second, third and fourth means are controlled to arrange them into a sequence of first signals including the preamble signal and at least one batch of code signals. The batch includes the synchronization signal and the plurality of calling signals which are divided into a plurality of groups. Each group of calling signals has the stabilization signal at the leading portion thereof. A carrier wave is modulated responsive to the sequence of first signals then the modulated carrier wave is transmitted.

Each of the receivers receives the modulated carrier wave and demodulates it into the sequence of second signals. At least the demodulated preamble signal and stabilization signal provides a reference voltage. A waveform-converting means changes the demodulated sequence of second signals into the sequence of first signals with the reference voltage. Power is supplied intermittently to at least the means for receiving the modulated carrier wave, in response to a first control signal, and for thereafter continuously supplying power to at least that same means, in response to a second control signal. The second control signal is generated upon detection of the preamble signal and the group code assigned to the receiver. The first control signal is generated upon detection of the synchronization signal.

Also, a digital radio paging communication receiver of the present invention comprises means for receiving and demodulating a carrier wave, modulated with a sequence of signals. The sequence of signals includes a preamble signal and at least one batch of code signals, the batch including a synchronization signal and a plurality of calling signals which are divided into a plurality of groups. Each group has a stabilization signal at the leading portion thereof. Responsive to at least the preamble signal and the stabilization signal, a reference voltage is provided. A waveform-converting means changes the sequence of signals into a binary digital form, along the reference voltage. A first control signal is generated upon detection of the preamble signal and the group code assigned to its own receiver. A second control signal is generated upon detection of the synchronization signal. Contenuous power is supplied to at least the receiving and demodulating means in response to the first control signal, and for providing an intermittent power in response to the second control signal.

BRIEF DESCRIPTION OF THE DRAWINGS

The aforementioned and other objects and features of the invention will be more apparent from the detailed description hereunder taken in conjunction with the accompanying drawings, wherein:

FIGS. 5(a)–(g) show typical signal code formats of transmitted signal codes, according to the present invention;

DETAILED DESCRIPTION OF THE INVENTION

In FIG. 1(a), a British Post Office POCSAG signal code is known comprising a preamble signal P and a plurality of code batches of signals B1, B2, . . . . Each batch of signals comprises a one-word synchronization signal SC and eight groups G1–G8. The preamble signal is composed of a logic 1/0 pattern, and each group comprises two calling signals. In a conventional receiver, the battery saving operation is discontinued only for a period of $t_{01}$ in response to the preamble signal P, and the power supply is temporarily suspended for a period of $t_{02}$, except to a circuit used for word synchronization and timing counting. Next, in the period $t_{03}$ of the receiver's own group G6, power supply is resumed to detect the calling signals, and after the lapse of this period, i.e. during the period $t_{04}$, power supply is again suspended.

Thus, the conventional battery saving system has a disregard for a period of time $t_r$ extending from the initiation of the power supply in its own group until it reaches its stable code signal receiving operation. Also, the receiving operation of its own calling codes is immediately started without receiving any signal for renewing bit synchronization. Usually the period $t_r$ is about 10 msec, which begins with initiation of the power supply and continues until the occurrence of signals in the waveform shaping circuit output.

The following two disadvantages are found in this signal code format. Firstly, bit synchronization performance heavily depends on the fluctuation in the radio propagation characteristics. Therefore, in the POCSAG system, the bit synchronization, which is established on the reception of the preamble signal P and synchronization signal SC, is not necessarily adequate for reception and detection of its own group code (the 6th group) which occurs after the lapse of the period $t_{02}$, as shown in FIGS. 1(a) and 1(b). Secondly, the transmission pattern of all "1" or all "0" over 10 or more bits generally occurs in digital signals. Therefore, the setting of the reference voltage deserves particular attention in the waveform shaping circuit which converts the output of a low-pass filter into a rectangular wave.

Figure 2:
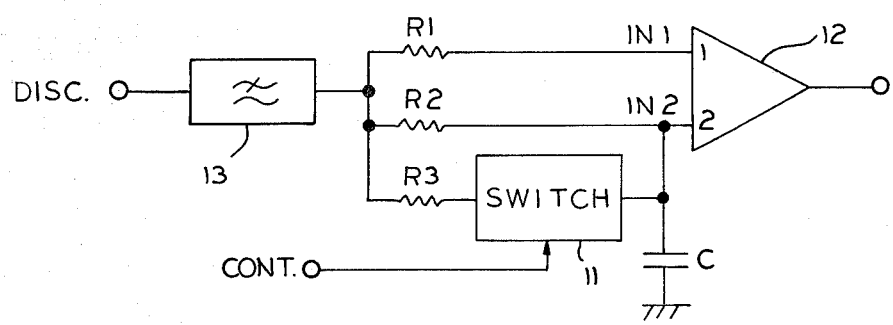
FIG. 2 illustrates an example of a waveform shaping circuit.

The aforementioned waveform shaping circuit, illustrated FIG. 2, is intended for improving the waveform-conversion and the build-up characteristics. First, at the time when the power supply is demanded, receiver controls a switch 11 responsive to a control signal CONT. Switch 11 connects a resistor R3 in parallel with another resistor R2, and thereby accelerates the response in a time constant circuit or a lowpass filter (consisting of the resistors R2 and R3 and a capacitor C) to quickly establish the reference voltage at one input (IN2) of a comparator 12.

Soon after the establishment of the reference voltage, the waveform shaping circuit disconnects the resistor R3 by controlling the switch 11 with the CONT signal, and switches the time constant of resistor R2 and capacitor C to the larger value. Therefore, once the reference voltage is established, the circuit can reliably respond even to a somewhat biased pattern, but a problem lies in the relatively long period of time that is required for establishing the reference voltage. The establishment of the reference voltage requires only a short period of time, if the input digital signals, which have passed through a filter 13, have many logic 1's or many variation points (for instance 101010 . . . ). However, it will require a long period if the proportion of logic "0's" to the input digital signals continues to be exceedingly great.

Figure 1:
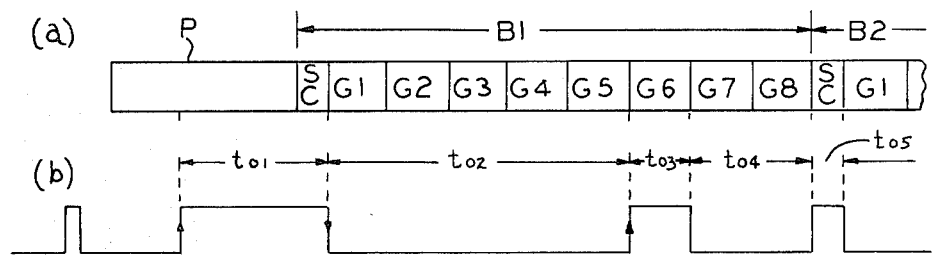
FIGS. 1(a) and 1(b) are diagrams respectively showing the signal code format and the timing of the battery saving operation in the British Post Office POCSAG system.
Figure 3:
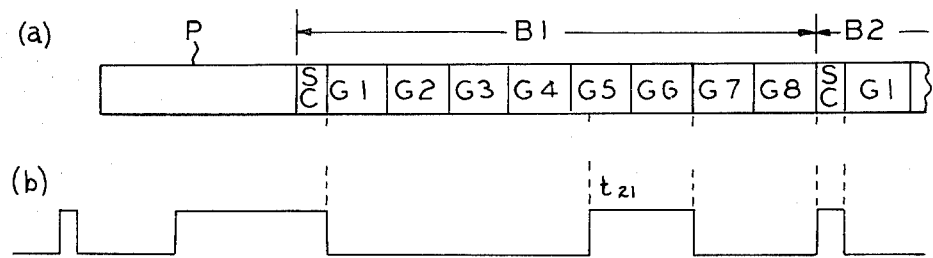
FIGS. 3(a) and 3(b) are diagrams respectively showing the code format and the timing of the battery saving operation in the POCSAG system.

Accordingly, there is some doubt about the applicability of such a waveform shaping circuit, such as this one, to a signal code format like POCSAG because, in a power source activation system, such as that illustrated in FIG. 1, signal detection is accomplished simultaneously with the power source activation. Thus, there is no time for the receiver to build up its power supply and signal reception is thereby made difficult. The build-up time can conceivably be secured by adjusting a timer so that the power supply be activated. Activation occurs as illustrated in FIGS. 3(a) and 3(b), at the time ($t_{21}$) of the fifth group immediately preceding the pertinent (sixth) group, but this method still has disadvantages on power consumption and bit synchronization.

Before describing the specific details of the present invention, its general features will be explained. To quickly establish the reference voltage in the waveform shaping circuit and to facilitate bit synchronization, a specific sequence of codewords having many variation points of logic "1" and "0" is placed at the top of the calling word or information word sequence in each group. A particularly preferred sequence of codewords is the alternate arrangements of "1" and "0".

Figure 4:
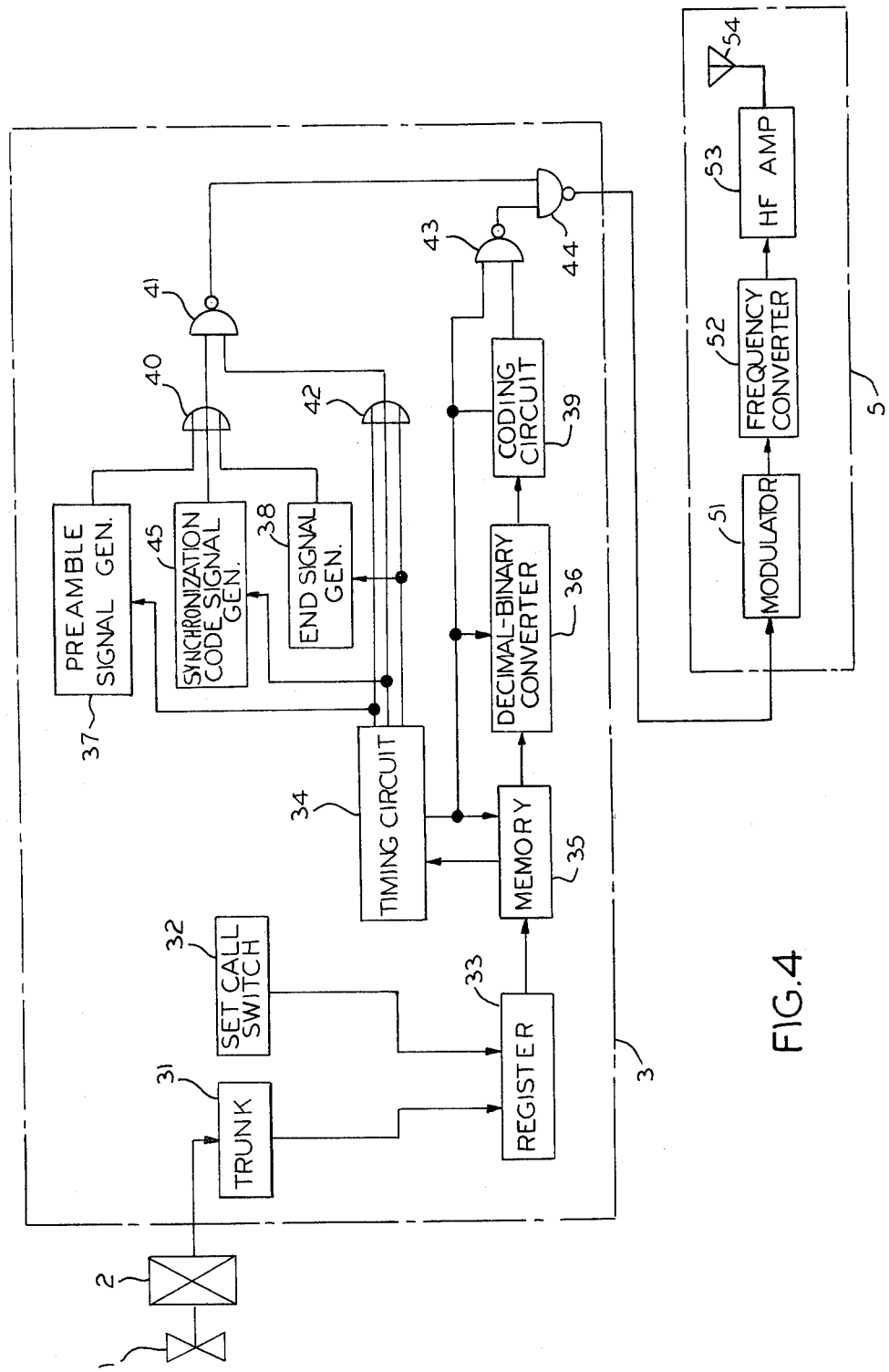
FIG. 4 is a block diagram illustrating a transmitter for an embodiment of the present invention.

In FIG. 4, the transmitter comprises an encoder 3 and a transmitting section 5. The encoder 3 further comprises a trunk 31 connected to common subscriber telephone set 1 by way of a switching system 2, a register 33, a set call switch 32, a memory 35, a decimal-binary converter 36, an encoding circuit 39, a preamble signal generator 37, a synchronization signal generator 45, an end signal generator 38, OR gates 40 and 42, NAND gates 41, 43 and 44. A timing circuit 34 controls the circuits 35–40, 42, 43 and 45. The transmitting section 5 is composed of a generally known modulator (for instance an FSK modulator) 51, a frequency converter 52, a high-frequency amplifier 53 and an antenna 54.

The operation of this transmitter will be described hereunder.

When a subscriber dials on his telephone set 1, the calling number assigned to a receiver (shown in FIG. 6 below), the dialled number is supplied to the trunk 31 by way of the switching system 2, and then to the register 33. Also, an operator can manually enter the calling number into the register 33, by pressing the set call switch 32. Upon receipt of the calling number having a prescribed number of digits (for instance four digits), the register 33 converts its content into a binary-coded decimal number and feeds it to the memory 35.

The memory 35 successively stores the fed calling numbers until it receives a read demand from the timing circuit 34. Also, when the first calling number is entered into the memory 35, it actuates the timing circuit 34. A prescribed period of time after a signal is given to actuate it, the timing circuit 34 in turn actuates the preamble signal generator 37. Generator 37 supplies the preamble signal or code, for the period of time allocated for the signal (for example 1.125 sec.), as shown in FIGS. 5(a) and (b), the signal being transmitted to the transmitting section 5 by way of the OR gate 40 and the NAND gates 41 and 44. This preamble signal typically has 225 bits of the logic 1/0 pattern as illustrated in FIG. 5(c). The preamble signal generator 37 can be composed, for instance, of a multivibrator and a counter to count the number of pulses.

Upon completion of the supply of this preamble signal, the timing circuit 34 actuates the synchronization code signal generator 45 to supply the synchronization signal (as shown in FIG. 5(d)) for the duration of time illustrated in FIG. 5(b) (for example 0.16 sec.) to the OR gate 40 and the NAND gates 41 and 44. The synchronization code signal generator 45 can comprise, for instance, a 32-bit counter driven by the output of the timing circuit 34 and a read-only memory (ROM) which generates the aforementioned pattern, with its address being designated by the output of the counter.

Upon completion of the supply of this synchronization signal, the timing circuit 34 actuates the preamble signal generator 37 and keeps it on for the fixed period of time $X_o$ shown in FIG. 5(e), to generate a stabilization signal having the same pattern as that of the preamble signal. The stabilization signal is used to make the receiver operate stably, as will be described hereunder.

As soon as the preamble signal generator 37 completes its action, the timing circuit 34 gives an instruction for read out of the first group to the memory 35. At the same time, circuit 34 keeps the encoding circuit 39 and the NAND gate 43 switched on for the period of time during which the calling signals illustrated in FIG. 5(e) remain in existence. The information stored in the memory 35 is supplied to the decimal-binary converter 36, which converts binary-coded decimal (BCD) numbers into, for instance, 21-bit binary codes. The encoding circuit 39 adds 10 check bits and one even parity bit to each of the 21-bit codes, and successively supplies the 32-bit words thereby formed to the transmitting section, by way of the NAND gates 43 and 44.

A word in the calling signal can be composed, as shown in FIG. 5(f). A maximum of 20 calls can be transmitted in a group as illustrated in FIG. 5(e). A substantial part of this encoding circuit can include the circuit using a shift register and an adder, disclosed by Wesley Peterson, in "Error-Correcting Codes", The M.I.T. Press, 1961, pp. 149–152.

Now, if there are 19 or fewer calling signals in the first group, the memory circuit 35 activates the timing circuit 34 to stop the circuits 35, 36, 39 and 43. At the same time, the timing circuit 34 actuates the end signal generator 38 and keeps it on for a period of time corresponding to the remaining part of the calling signal area.

Generator 38 supplies an end signal (as shown in, for instance, FIG. 5(g)) to the transmitting section 5 by way of the OR gate 40 and the NAND gates 41 and 44 for restoring the battery saving operation of the receiver. This end signal generator 38 comprises, for instance, a 32-bit counter driven by the output of the timing circuit 34 and a read-only memory (ROM) which, with its address designated by the output of this counter, generates the aforementioned pattern. After the first group is completed in this manner, the signals of the second, third and fourth groups are likewise transmitted successively. Then the timing circuit 34 is suspended from action until the next calling signals are entered into the memory 35. Since the groups of signals are not transmitted in the absence of calling signals, the length of time between the signals groups S and S', as shown in FIG. 5(a), is variable.

The output from the encoder 3 is modulated by the FSK modulator 51, and then goes through the frequency converter 52 and the high-frequency amplifier 53, from which it is transmitted to the receiver by way of the antenna 54.

In the signal formats shown in FIGS. 5(a)–5(g), the frequencies of the transmissions and code formats of the preamble signal, synchronization signal, calling signals and end signal can be selected, as desired.

Figure 6:
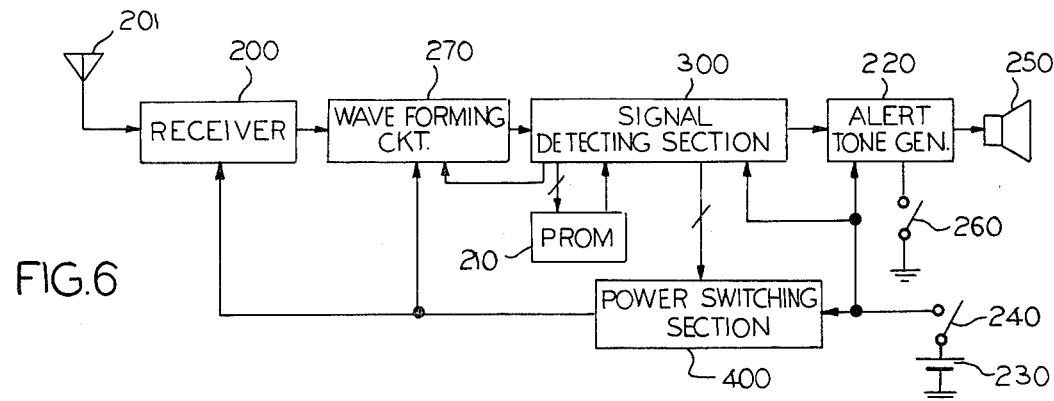
FIG. 6 is a block diagram illustrating a receiver for an embodiment of the present invention.

In FIG. 6, an FSK-modulated carrier wave is received by an antenna 201 and is entered into a receiver 200, which includes a discriminator. The signals demodulated therein are entered into a signal detecting section 300 by way of a waveform shaping circuit 270. The signal detecting section 300, upon detection of a preamble signal, drives a power switching section 400 to continuously supply the voltage of a battery 230, by way of a switch 240, to the receiver 200 and to the waveform shaping circuit 270.

Upon detection of a synchronization signal during the period of continuous power supply, a timer or counter, which is included in the signal detecting section 300 is actuated to temporarily switch off the power switching section 400, and thereby suspend voltage supply to the receiver 200 and the waveform shaping circuit 270 until a period of time (or a time window) allocated for the reception of the signal group for the receiver 200 arrives. A voltage is again supplied to the receiver 200 and the waveform shaping circuit 270 during this period. The calling signals of the group are compared with signals which are read out of a programmable read-only memory (PROM) 210 in the signal detecting section. An alert tone generator 220 is driven, if these signals coincide with each other, to sound a speaker 250. A switch 260 is provided for manually inactivating the alert tone generator 220.

If an end signal is detected by the signal detecting section 300 or if the period of time for the pertinent group elapses, the power switching section 400 is driven to supply the receiver 200 and the waveform shaping circuit 270, with a voltage of a predetermined cycle.

Figure 7:
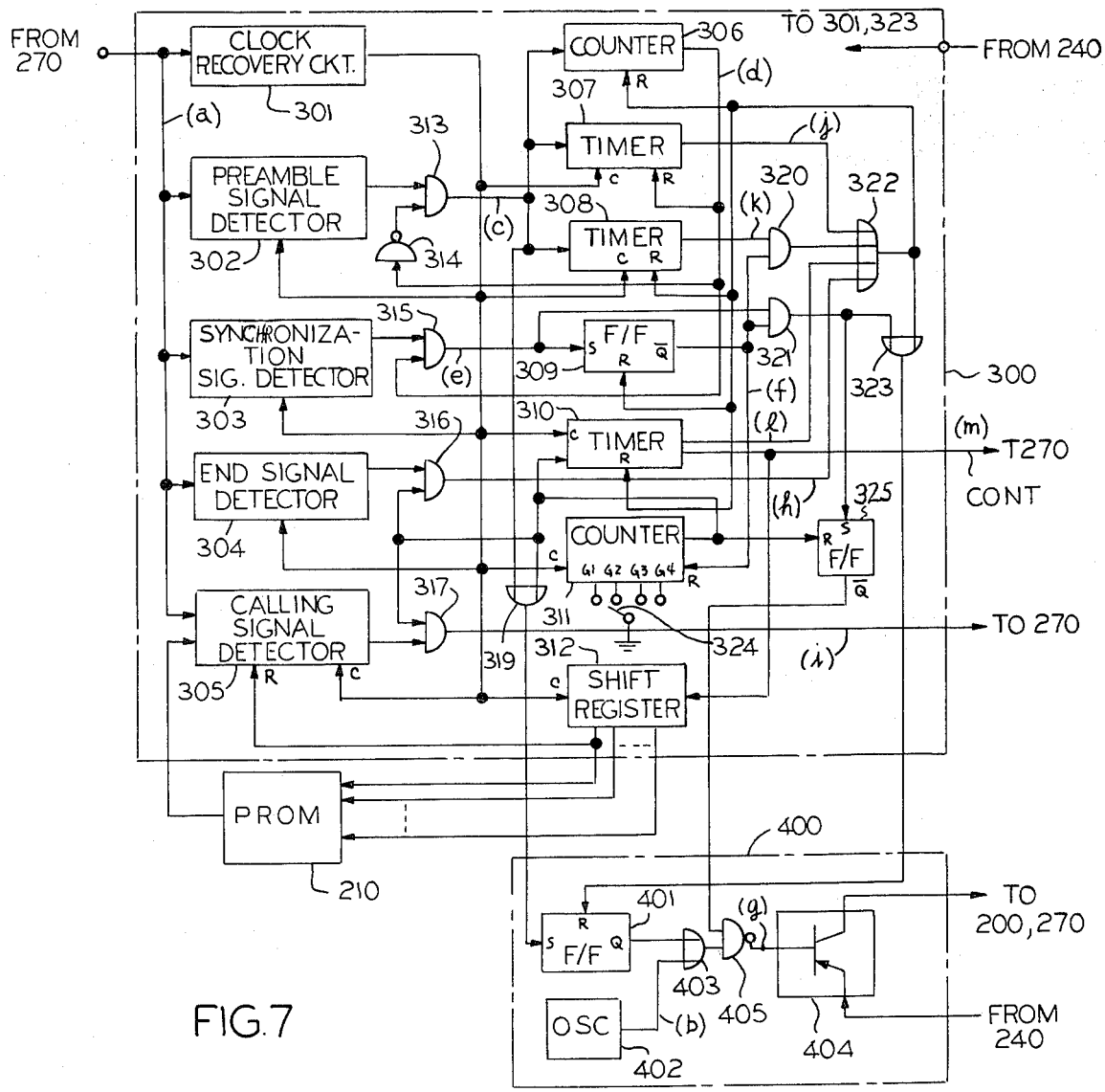
FIG. 7 is a more detailed block diagram illustrating the signal detecting circuit and power supply switching section referred to in FIG. 6.

FIG. 7 illustrates a specific composition of the signal detecting section 300 (FIG. 6) and the power switching section 400. The signal detecting section 300 has a clock recovery circuit 301; a preamble signal detector 302; a synchronization signal detector 303; an end signal detector 304; a calling signal detector 305; counters 306 and 311; timers 307, 308 and 310; flip-flops 309 and 325; a shift register 312; AND gates, 313, 315–317, 320 and 321, an inverter 314; OR gates 319, 322 and 323, and a switch 324. The power switching section 400 comprises a flip-flop 401, an oscillator 402, an OR gate 403, a NAND gate 405 and a switch 404.

Figure 8:
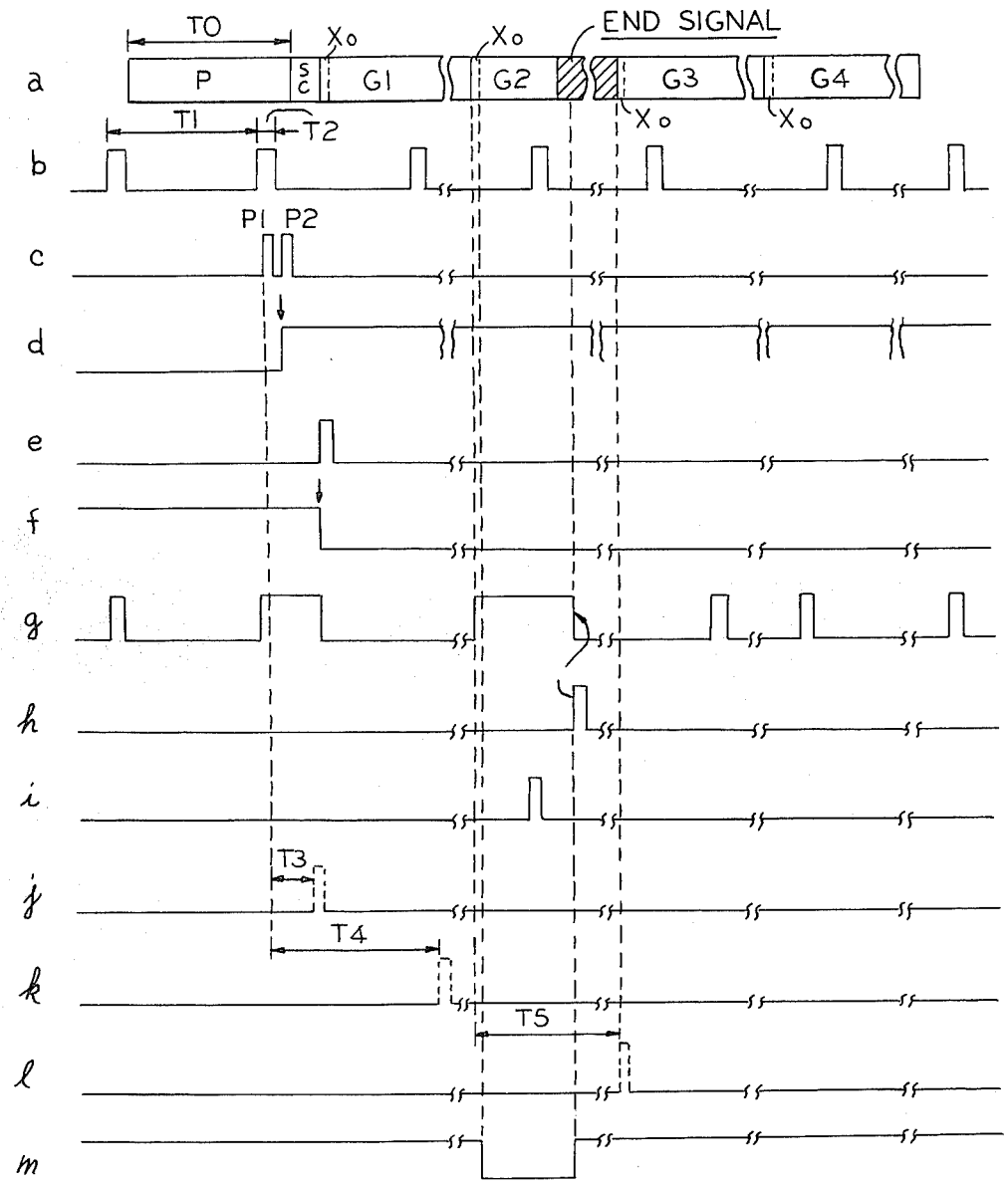
FIGS. 8(a)–8(m) are time charts showing examples of waveforms at different points (a)–(m) in FIG. 7, respectively.

The operation of this receiver will be described in detail hereunder with reference to the time charts of FIG. 8.

Usually the receiver 200 and the waveform shaping circuit 270 are intermittently operated, as the power supply to the receiver 200 is turned on and off by driving the switch 404, responsive to the output of the oscillator 402 (FIG. 8(b)). This on and off cycle (T1) is set slightly shorter than the length of the preamble signal sequence (TO in FIG. 8(a)). During the period of time (T2), power is supplied to the receiver 200 and the waveform shaping circuit 270. The period T2 is supposed to be the sum of the build-up time ($t_r$) of the receiver and the waveform shaping circuit plus the length of time during which one or more of the specific patterns in the preamble signal can be received.

If the preamble signal is transmitted when the power is supplied to the receiver 200 and the waveform shaping circuit 270, this signal, as stated above, will be received and decoded by the receiver 200 and then it is entered into the signal detecting section 300, by way of the waveform shaping circuit 270 (FIG. 6). At this time, the time constant of the waveform shaping circuit 270 (illustrated in FIG. 2) is set at a small value by a control signal CONT (FIG. 8(m)) which is received from the signal detecting section 300. Therefore, the prescribed decision reference level will be quickly reached.

Figure 9:
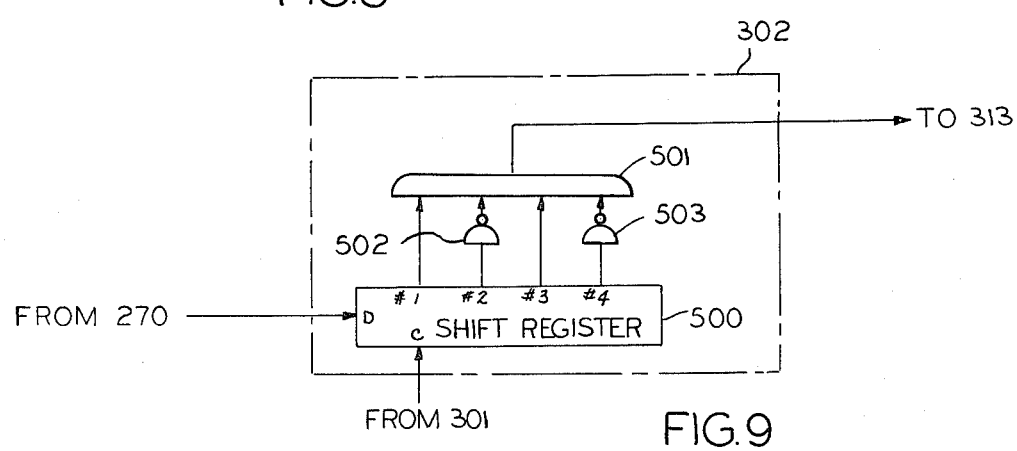
FIG. 9 shows a specific example of the preamble signal detector.

Then clock pulses are recovered by the clock recovery circuit 301 (which establishes bit synchronization) from the signals entered into the signal detecting section 300. For a specific example of the clock recovery circuit, reference is made to the U.S. Pat. No. 4,087,627 issued on May 2, 1978. The clocks recovered therein are supplied to the preamble signal detector 302, which detects a four-bit "1, 0, 1, 0" pattern out of the input signals thereto. This preamble signal detector 302 can typically comprise a shift register 500, inverters 502 and 503 and an AND gate 501, as illustrated in FIG. 9. As the pattern "1, 0, 1, 0" is entered into the shift register 500, the output of the AND gate 501 turns to the logic "1" condition, which means the detection of the preamble signal.

Upon detection of the first "1, 0, 1, 0" pattern, shown in FIG. 8(c), by the preamble signal detector 302, a pulse P1 is generated and supplied to the counter 306 (FIG. 7) by way of the AND gate 313 to reset the timers 307 and 308. The output of the AND gate 313 also sets the flip-flop 401 by way of the OR gate 319. As the flip-flop 401 is set, the switching circuit 404 is driven by way of the OR gate 403 and the NAND gate 405, irrespective of the output condition of the oscillator 402. The power supply is applied continuously to the receiver 200 and to the waveform shaping circuit 270 (FIG. 6), as illustrated in FIG. 8(g).

Unless the second "1, 0, 1, 0" pattern is received within a predetermined period of time after the detection of the first such pattern, the first received pattern may have been that of some other signal which was received erroneously. To prevent a response to such an erroneous operation, if no second "1, 0, 1, 0" pattern is detected within a fixed length of time, for instance T3 (about 80 msec.) shown in FIG. 8(j), after the reception of the first "1, 0, 1, 0" pattern, the output of the timer 307 (FIG. 8(j)) is used to reset the flip-flop 401 by way of the OR gates 322 and 323. As a result, the receiver system returns to its initial state. The power supply for the receiver 200 and the waveform shaping circuit 270 is turned on and off responsive to the output of the oscillator 402, to make the system ready for reception of the next "1, 0, 1, 0" pattern in the preamble signal.

Figure 10:
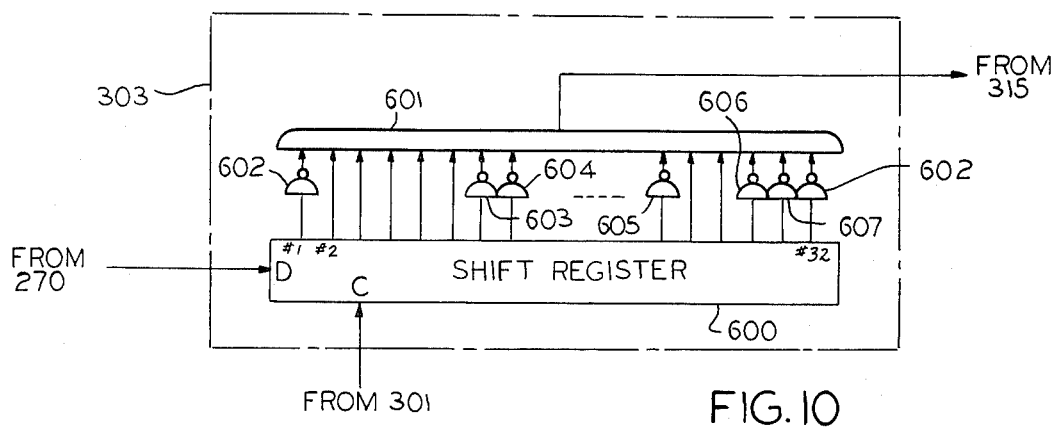
FIG. 10 shows a specific example of the synchronization code detector.

If the second "1, 0, 1, 0" pattern (FIG. 8(c)) is received and detected before the timer 307 gives its output, a pulse P2 will be supplied. The output (FIG. 8(d)) of the counter (for instance a binary counter) 306 (FIG. 7) will reset the timer 307, block the AND gate 313 by way of the inverter 314, and activate the AND gate 315 to make the detection output of the synchronization signal detector 303. FIG. 10 shows detector 303 as including, for instance, a shift register 600, an AND gate 601 and inverters 602–608.

In this manner, there is not a normal reception if no synchronization signal is detected within a predetermined period of time, for example T4 shown in FIG. 8(k). (Period T4 is a period of time which is not less than that corresponding to the preamble signal and the synchronization signal, for instance about 1.3 seconds). After first "1, 0, 1, 0" pattern is detected, the reception field level will be regarded as being inadequate for normal reception; or, the detected "1, 0, 1, 0" pattern is deemed to be that of some other signal which was received erroneously. The flip-flop 401 (FIG. 7) will be reset by the output of the timer 308 (FIG. 8(k)) by way of the AND gate 320 and the OR gates 322 and 323. As a result, the receiver system will return to its initial state. Power supply to the receiver 200 (FIG. 6) and the waveform shaping circuit 270 is turned on and off by the output of the oscillator 402 to make the system ready again for reception of the "1, 0, 1, 0" pattern in the preamble signal.

However, if a synchronization codeword SC (FIG. 8(a)) is received before the timer 308 (FIG. 7) gives its output, the flip-flop 309 will be set by way of the AND gate 315. At the same time, the flip-flop 401 will be reset by way of the AND gate 321 and the OR gate 323. The output of the flip-flop 325 will control the NAND gate 405 to temporarily suspend the power supply to the receiver and the waveform shaping circuit.

When the period arrives for the pertinent group (for instance, the second group G2 (FIG. 8a)), set by the switch 324 (FIG. 8), the output of the counter 311 (FIG. 7) will release the NAND gate 405 by way of the flip-flop 325 to provide a predetermined time window, actuate the timer 310 for the predetermined duration T5 (about 3.275 sec.) of the pertinent group, set the flip-flop 401 by way of the OR gate 319, and further actuate the AND gates 316 and 317 which are connected to the outputs of calling signal detector 305 or end signal detector 304. The stabilization signal of 15 bits, is provided at the leading portion of the group. The stabilization signal is the "1, 0, 1, 0, ..." pattern XO shown in FIG. 5(e). During reception of the stabilization signal, the waveform shaping circuit 270 (FIG. 6) quickly reaches its prescribed decision level and the receiver achieves bit synchronization again. After the reception (FIG. 8(m)), the time constant in the waveform shaping circuit is enlarged by the signal CONT to make it immune from the influence of any biased pattern, and the shift register 312 (FIG. 7) is reset. Then the number of clock pulses from the clock recovery circuit 301 is counted to determine spaces between words.

Since each word in this example consists of 32 bits as shown in FIG. 5(f), the shift register 312 counts 32 input clock pulses, and gives its output at every 32nd clock pulse from the final stage. Shift register 312 supplies the PROM 210 with read signals comprising 32 outputs from each stage. As a result, the PROM 210 successively feeds calling signals stored therein to the calling signal detector 305, which compares signals from the PROM 210 and the input signals, judges that its own calling signals have been received when the two sets of signals are found identical with each other, and then it drives the alert tone generator 220 (FIG. 6) by way of the AND gate 317. The speaker 250 issues an alert tone.

Figure 12:
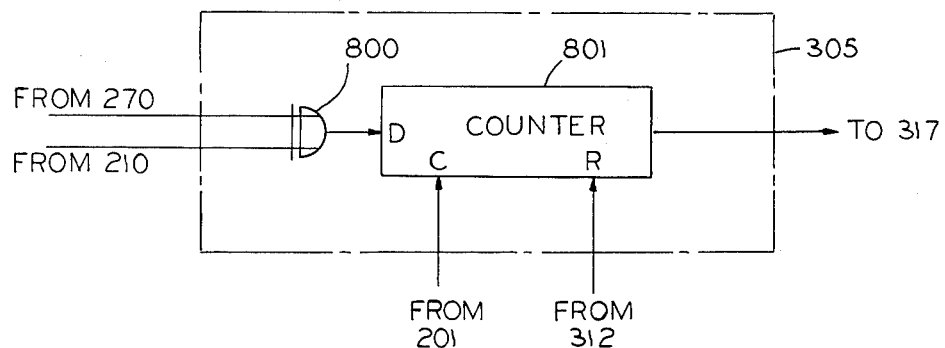
FIG. 12 shows a specific example of the end mark signal detector.

The calling signal detector 305 can comprise, for instance, an exclusive-OR gate 800 (FIG. 12) which responds to the signals from the PROM 210 (FIG. 7) and the output signals from the waveforming circuit 270, and a counter 801 (which may be a D type flip-flop). The state of the counter 801 is detected on a word-by-word basis in response to signals from the shift register 312. These operations are accomplished in the following manner. First a check is made to determine whether or not, within the duration of one word, the output of the exclusive-OR circuit 800 has ever been logic "1". If it has never been "1," within the duration of one word, a coincidence is assumed to exist between the signals from the PROM 210 and the input signals. The alert tone generator 220 is then driven by way of the AND gate 317. If the output of the exclusive-OR circuit 800 (FIG. 12) has ever been "1", within one word it will be judged that the received input signals are different from the pertinent calling signals.

If there is an end signal shown in FIG. 5(g) within the period of the pertinent group as illustrated in FIG. 8(a), the end signal detector 304 (FIG. 7) detects it, as shown in FIG. 8(h), resets the counter 306, the timers 308 and 310 and the flip-flop 309 by way of the OR gate 322, and the flip-flop 401 by way of the OR gate 323, in order to return the receiver 200 to its initial state. The resulting operation turns on and off the output of the switching element 404, according to the output of the oscillator 402.

Figure 11:
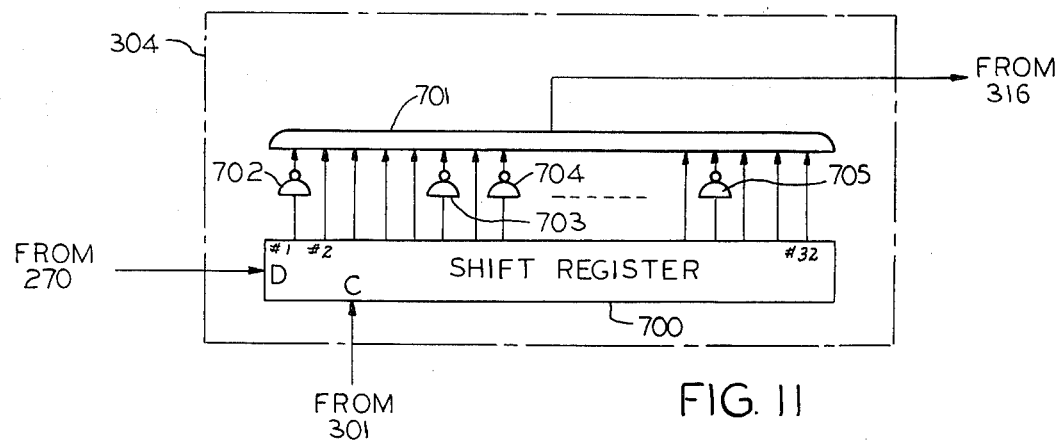
FIG. 11 shows a specific example of the calling signal detector.

The end signal detector 304 (FIG. 11) can consist, for example, of a shift register 700, an AND gate 701 and inverters 702–705.

If the pertinent signal code group is filled with calling signals, the output (FIG. 8(l) of the timer 310 (FIG. 7) will reset the counter 306, the timers 308 and 310 and the flip-flop 309 by way of the OR gate 322 and the flip-flop 401 by way of the OR gate 323, to return the receiver system to its initial state.

Herein, the timers 307, 308 and 310 can be composed of a counter (CD 4017 marketed by RCA) for frequency-dividing the output of the clock recovery circuit 301, or CR time constant circuits. The oscillator 402 can be a transistor-based astable multivibrator, a CR oscillating circuit or the like. The switching element 404 can comprise a transistor, an FET, an SCR or the like. The PROM 210 can comprise a diode matrix, a transistor matrix (for instance $\mu$PB 406 marketed by NEC) and the like.

Figure 13:
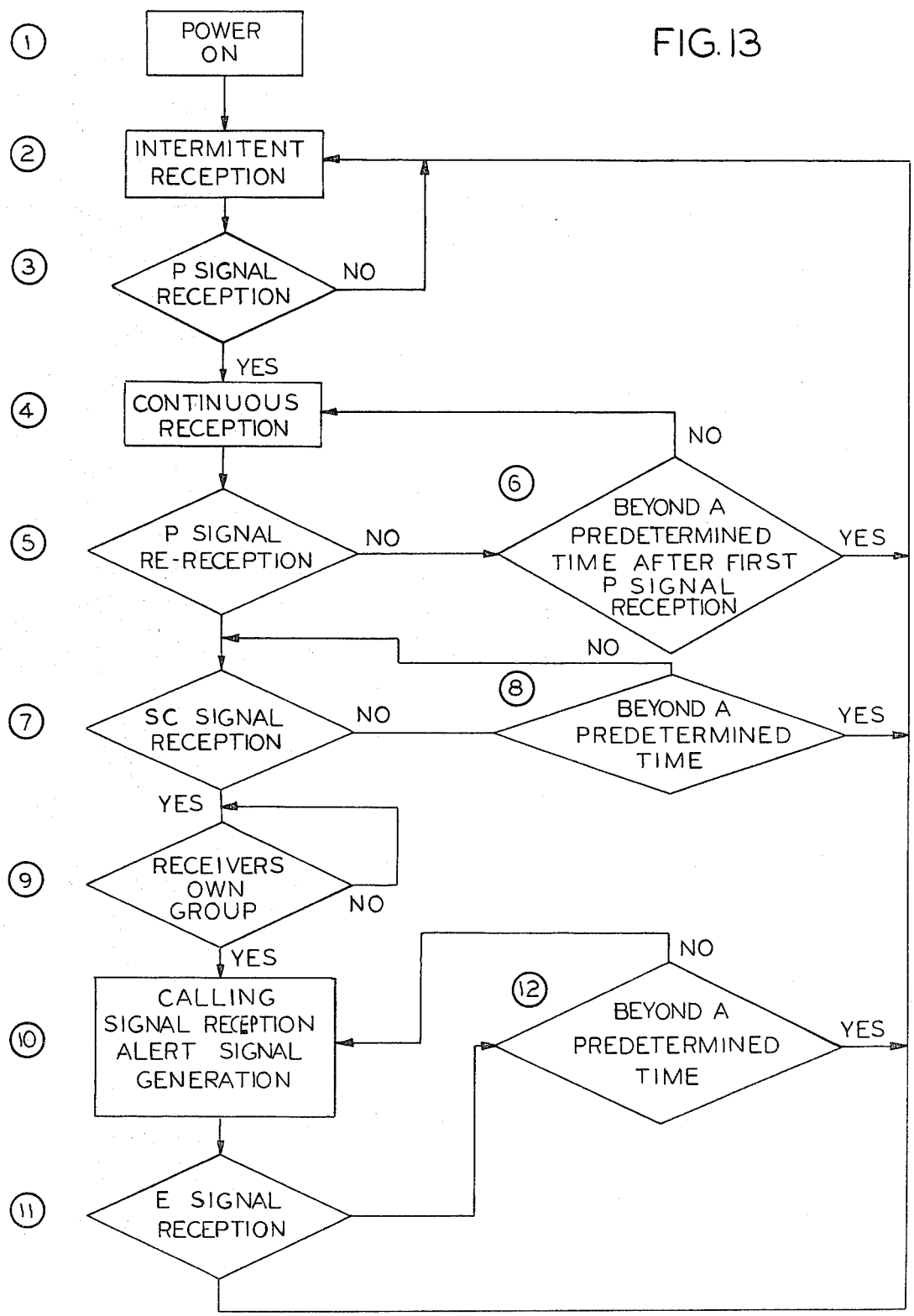
FIG. 13 is a flow chart representing the operation of the receiver.

The operations described above are summed up in the flow chart of FIG. 13 as follows:

(1) The power source is turned on.

(2) The power supply to the receiver 200 and the waveform shaping circuit 270 is kept intermittently on to enable an intermittent reception.

(3) While the power supply to the receiver is on, a "1, 0, 1, 0" pattern in the preamble signal (P signal) is searched for, and the process advances to step (4) if one is received or returns to step (2) if none is received.

(4) When the first "1, 0, 1, 0" pattern is received, the power supply to the receiver is made continuous.

(5) A search is made for the second "1, 0, 1, 0" pattern, and the process advances to step (7) if it is received or to step (6) if not.

(6) If a predetermined period of time T3 elapses after the reception of the first "1, 0, 1, 0" pattern, the process returns to step (2) or, if not, moves to step (4).

(7) If the detection of the synchronization signal SC is confirmed, the process advances to step (9) or, if not, to step (8).

(8) If a predetermined period of time T3 elapses after the reception of the first "1, 0, 1, 0" pattern, the process returns to step (2) or, if not, to step (7).

(9) The receiving operation is suspended until the arrival of the receiver's own code signal group.

(10) Upon arrival of its own code signal group, the receiver resumes its receiving operation to receive calling signals and, upon confirmation of reception, issues an alert tone.

(11) The end signal is detected during the period of the pertinent group and, if its reception is confirmed, the process returns to step (2) or, if not, moves ahead to step (12).

(12) If a predetermined period of time T5 elapses after the arrival of the pertinent group, the process returns to step (2) or, if not, to step (10).

As heretofore described, the present invention can enable both wired and wireless paging communication systems, affected due to variations in transmission characteristics, to achieve a highly reliable detection together with low power consumption.

What is claimed is:

1. A digital radio paging communication system having a transmitter and a plurality of receivers, said transmitter comprising:
   (a) first, second, third and fourth means for generating a preamble signal, a synchronization signal, a plurality of calling signals and a stabilization signal, respectively;
   (b) fifth means for selectively controlling the outputs of said first, second, third and fourth means to arrange them into a sequence of first signals including said preamble signal and at least a batch of signals, said batch of signals including said synchronization signal and said plurality of calling signals which are divided into a plurality of groups, each group of signals having said stabilization signal at the leading portion thereof; and
   (c) sixth means for modulating a carrier wave with said sequence of first signals and for transmitting the modulated carrier wave, each of said plurality of receivers comprising:
   (d) seventh means for receiving said modulated carrier wave and demodulating it into said sequence of second signals;
   (e) eighth means responsive to at least the demodulated preamble signal and stabilization signal for providing a reference voltage;

(f) ninth means for waveform-converting the demodulated sequence of second signals into said sequence of first signals with said reference voltage;

(g) tenth means coupled to the output of said ninth means for providing a first control signal upon detection of said preamble signal and for providing a second control signal upon detection of said synchronization signal; and (h) eleventh means including means for continuously supplying power to at last said seventh means in response to said first control signal, and means for supplying power to at least said seventh means during a period of time allocated for reception of said group of signals for its own receiver in response to said second control signal.

2. The digital radio paging communication system as claimed in claim 1, wherein said transmitter further comprises twelfth means for generating an end mark signal and thirteenth means for inserting said end mark signal into an idle time space which may exist in at least one of said plurality of groups of signals, and wherein said tenth means includes means for providing a third control signal upon detection of said end mark signal; and said eleventh means includes means for returning to a battery saving operation in said receiver in response to said third control signal.

3. The digital radio paging communication system as claimed in claim 1 or 2, wherein said receiver further comprises means coupled to at least said ninth and tenth means for establishing bit synchronization in response to at least said preamble signal, synchronization signal, and stabilization signal.

4. A digital radio paging communication receiver comprising:

(a) first means for receiving and demodulating a carrier wave modulated with a sequence of signals, said sequence of signals including a preamble signal followed by at least one batch of signals, said batch including a synchronization signal and a plurality of calling signals which are divided into a plurality of groups of signals, each group having a stabilization signal at the leading portion thereof;

(b) second means responsive to at least said preamble signal and stabilization signal for providing a reference voltage;

(c) third means for waveform-converting said sequence of signals into a binary digital form in response to said reference voltage;

(d) fourth means coupled to the output of said third means for providing a first control signal upon detection of said preamble signal and, and for providing a second control signal upon detection of said synchronization signal; and (e) fifth means for continuously supplying power to at least said first means in response to said first control signal, and for providing power to at least said first means during a period of time allocated for reception of said group of signals of the receiver which contains the first through fourth means, in response to said second control signal.

5. The digital radio paging communication receiver as claimed in claim 4, wherein at least one of said plurality of groups of signals includes an end mark signal, said fourth means includes sixth means for providing a third control signal upon detection of said end mark signal, and said fifth means includes seventh means for supplying said intermittent power to at least said first means responsive to said third control signal.

6. A digital radio paging communication receiver comprising:

(a) first means for receiving and demodulating a carrier wave with a sequence of signals, said sequence of signals including a preamble signal and at least one batch of signals, said batch including a synchronization signal and a plurality of calling signals which are divided into a plurality of groups of signals, each group having a stabilization signal at the leading portion thereof;

(b) second means responsive to at least said preamble signal and stabilization signal for providing a reference voltage;

(c) third means for waveform-converting said sequence of signals into a binary digital form responsive to said reference voltage;

(d) fourth means responsive to detection of said preamble signal for continuously supplying power to at least said first means;

(e) fifth means responsive to detection of said synchronization signal for producing a predetermined time window after a predetermined period of time following termination of said synchronization signal in order to detect the group of signals assigned to said receiver, and (f) sixth means coupled to said fifth means for intermittently supplying power to at least said first means during said predetermined period of time and for supplying a continuous power to at least said first means during said predetermined time window.

7. A digital radio paging communication receiver as claimed in claim 6, wherein at least one of said plurality of groups of signals includes an end mark signal, and said sixth means includes seventh means responsive to detection of said end mark signal for intermittently supplying said power to at least said first means.

8. A digital radio paging communication system as claimed in claim 1 or 2 or 6 wherein each of said preamble signal and stabilization signal consists of a pattern of reversals 1, 0.

9. The digital radio paging communication system as claimed in claim 4 or 5, further comprising means coupled to at least said third and fourth means for establishing bit synchronization in response to at least said preamble signal, synchronization signal, and stabilization signal.

10. The digital radio paging communication system as claimed in claim 9, wherein each of said preamble signal and stabilization signal comprises a pattern of reversals 1, 0.

11. The digital radio paging communication system as claimed in claim 4 or 5, wherein each of said preamble signal and stabilization signal comprises a pattern of reversals 1, 0.

12. The digital radio paging communication system as claimed in claim 6 or 7, further comprising means coupled to at least said third through fifth means for establishing bit synchronization in response to said preamble signal, synchronization signal, and stabilization signal.

13. The digital radio paging communication system as claimed in claim 6 or 7, wherein each of said preamble signal and stabilization signal comprises a pattern of reversals 1, 0.

14. The digital radio paging communication system as claimed in claim 12, wherein each of said preamble signal and stabilization signal comprises a pattern of reversals 1, 0.

* * * * *